(12) United States Patent
Lee et al.

(10) Patent No.: US 9,470,888 B2
(45) Date of Patent: Oct. 18, 2016

(54) DRIVING APPARATUS, DRIVING METHOD THEREOF, AND SCANNING MIRROR

(71) Applicant: INDUSTRIAL TECHNOLOGY RESEARCH INSTITUTE, Hsinchu (TW)

(72) Inventors: Yao-Hui Lee, Tainan (TW); Pin Chang, Hsinchu (TW); Chung-De Chen, Chiayi (TW); Yu-Jen Wang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 99 days.

(21) Appl. No.: 14/276,714

(22) Filed: May 13, 2014

(65) Prior Publication Data

US 2015/0286050 A1    Oct. 8, 2015

(30) Foreign Application Priority Data

Apr. 3, 2014    (CN) .......................... 2014 1 0133720

(51) Int. Cl.
    *G02B 26/10*    (2006.01)
    *H04N 1/047*    (2006.01)

(52) U.S. Cl.
    CPC ............. *G02B 26/101* (2013.01); *G02B 26/10* (2013.01); *G02B 26/105* (2013.01); *H04N 1/047* (2013.01)

(58) Field of Classification Search
    CPC .............. G02B 26/0841; G02B 26/0833; G02B 26/001; G02B 26/105; G02B 26/101; G02B 26/10; B81B 2201/047; B81B 2201/042; H04N 1/047
    USPC ............ 359/198.1–199.4, 196.1–226.3, 904, 359/290–295, 838, 846, 871, 872; 250/204, 250/559.06, 559.29, 230, 234; 347/255–260; 353/39, 98–99; 385/15–18, 22; 398/12, 19, 45
    See application file for complete search history.

(56) References Cited

U.S. PATENT DOCUMENTS

| | | |
|---|---|---|
| 6,843,568 B2 | 1/2005 | Schenk et al. |
| 7,606,849 B2 | 10/2009 | Kushnick |

(Continued)

FOREIGN PATENT DOCUMENTS

| | | |
|---|---|---|
| CN | 101408672 B | 6/2010 |
| CN | 101539662 B | 5/2012 |

(Continued)

OTHER PUBLICATIONS

Intellectual Property Office, Ministry of Economic Affairs, R.O.C., "Office Action", Taiwan, Jan. 28, 2015.

(Continued)

*Primary Examiner* — Scott J Sugarman
*Assistant Examiner* — Kristina Deherrera
(74) *Attorney, Agent, or Firm* — Locke Lord LLP; Tim Tingkang Xia, Esq.

(57) ABSTRACT

The disclosure provides a driving apparatus, a driving method thereof, and a scanning mirror. The scanning mirror includes an accumulator unit and a processor unit. The accumulator unit receives and adds up a frequency control word and a first accumulation value to generate a second accumulation value. The processor unit coupled to the accumulator unit receives the second accumulation value. The processor unit generates a driving signal according the second accumulation value and the preset value and adjusts the second accumulation value for outputting the first accumulation value.

13 Claims, 11 Drawing Sheets

(56) References Cited

U.S. PATENT DOCUMENTS

| | | |
|---|---|---|
| 7,847,997 B2 | 12/2010 | Sandner et al. |
| 7,972,011 B2 | 7/2011 | Kurozuka et al. |
| 7,972,014 B2 | 7/2011 | Hung et al. |
| 8,154,782 B1 | 4/2012 | Brown |
| 2005/0190420 A1* | 9/2005 | Imai .................... G02B 26/123 |
| | | 359/210.1 |
| 2012/0280972 A1 | 11/2012 | Champion |

FOREIGN PATENT DOCUMENTS

| | | |
|---|---|---|
| EP | 2271121 A2 | 1/2011 |
| TW | 201018961 A | 5/2010 |
| TW | M389265 U1 | 9/2010 |
| TW | I355511 B | 1/2012 |
| TW | 201235698 A | 9/2012 |

OTHER PUBLICATIONS

Luo, Bing et al., A Drive Control Scheme Based on Phase-control for Silicon Micromechanical Gyroscopes, ACTA Automatica Sinica, 2012, p. 206-212, vol. 38, No. 2.

Hesham Omran et al., An All-Digital Direct Digital Synthesizer Fully Implemented on FPGA, IEEE, 2009, p. 1-6.

Dr. R. K. Sharma et al., Memory Reduced and Fast DDS Using FPGA, International Journal of Computer Theory and Engineering, 2010, p. 670-672, vol. 2, No. 4.

David James Betowski, Optimizing The Performance Of Direct Digital Frequency Synthesizers for Low-Power Wireless Communication Systems, 2004, Washington State University.

A. Tortschanoff et al., Position encoding and phase control of resonant MOEMS mirrors, Sensors and Actuators A: Physical, 2010, p. 235-240, 162.

* cited by examiner

DRIVING APPARATUS, DRIVING METHOD THEREOF, AND SCANNING MIRROR

CROSS-REFERENCE TO RELATED APPLICATIONS

This non-provisional application claims priority under 35 U.S.C. §119(a) on Patent Application No(s). 201410133720.5 filed in China on Apr. 3, 2014, the entire contents of which are hereby incorporated by reference.

TECHNICAL FIELD

The disclosure relates to a driving apparatus, a driving method thereof, and a scanning mirror.

BACKGROUND

Pico projection technology nowadays has two sorts, one is laser scanning projection technology based on laser light sources, and the other is digital light processing (DLP) technology or liquid crystal on silicon (LCOS) technology based on light emitting diodes (LED).

Pico LED projectors have a shorter lifespan and lower emitting efficiency of LED caused by its working temperature, lower brightness caused by its low photoelectric conversion efficiency, higher system power consumption caused by LEDs unceasingly emitting light, the more complicated optomechanical design of a precise focus lens, and a big volume, and is not shatterproof.

Pico laser projectors usually use red, green, and blue (RGB) lasers as light sources and also use a MEMS double-axis scanning component or two MEMS single-axis scanning components to project 2D images by the fast scanning. The double-axis scan projection has two sorts, one is a raster scan, and the other is a lissajous scan. The raster scan is line-by-line scanning which is capable of generating parallel scan lines for a scanned frame, but scanning components for the raster scan consume lots of power. Compared with the raster scan, scanning components for the lissajous scan consume less power, but since the scan track of the lissajous scan is more complicated, the lissajous scan needs to operate under a specific frequency range in order to achieve a wide-angle scan and have better image quality. If a driving module for the scanning components can not provide such a specific frequency for the lissajous scan, the scan lines may have a low density causing a low image resolution, flickers may occur on projected frames, and a part of one frame may have a lower frame rate. Accordingly, for pico laser projectors, there are still the above problems to be resolved.

SUMMARY

According to one or more embodiments, the disclosure provides a driving apparatus for a scanning mirror. In one embodiment, the driving apparatus may include an accumulator unit and a processor unit. The accumulator unit may receive and add up a frequency control word and a first accumulation value to generate a second accumulation value. The processor unit may couple with the accumulator unit and according to the second accumulation value and a preset value, generate a driving signal and adjust the second accumulation value to output the first accumulation value.

According to one or more embodiments, the disclosure provides a driving method for a scanning mirror. In one embodiment, the driving method may include the following steps. First, receive a frequency control word and a first accumulation value. Then, add up the frequency control word and the first accumulation value to generate a second accumulation value. Finally, generate a driving signal and adjust the second accumulation value to output the first accumulation value according to the second accumulation value and a preset value.

According to one or more embodiments, the disclosure provides a scanning mirror. In one embodiment, the scanning mirror may include a mirror module, a first driving unit, a first accumulator unit, and a first processor unit. The mirror module may include a first shaft for rotating along a first direction. The first driving unit may couple with the first shaft and drive the first shaft to rotate along the first direction to drive the mirror module according to a first driving signal. The first accumulator unit may receive a first frequency control word and a first accumulation value and add up the first frequency control word and the first accumulation value to generate a second accumulation value. The first processor unit may couple with the first accumulator unit and the first driving unit and according to the second accumulation value and a first preset value, generate the first driving signal and adjust the second accumulation value to output the first accumulation value.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In the following embodiments, the same elements or similar elements may be marked with the same label.

Figure 1:
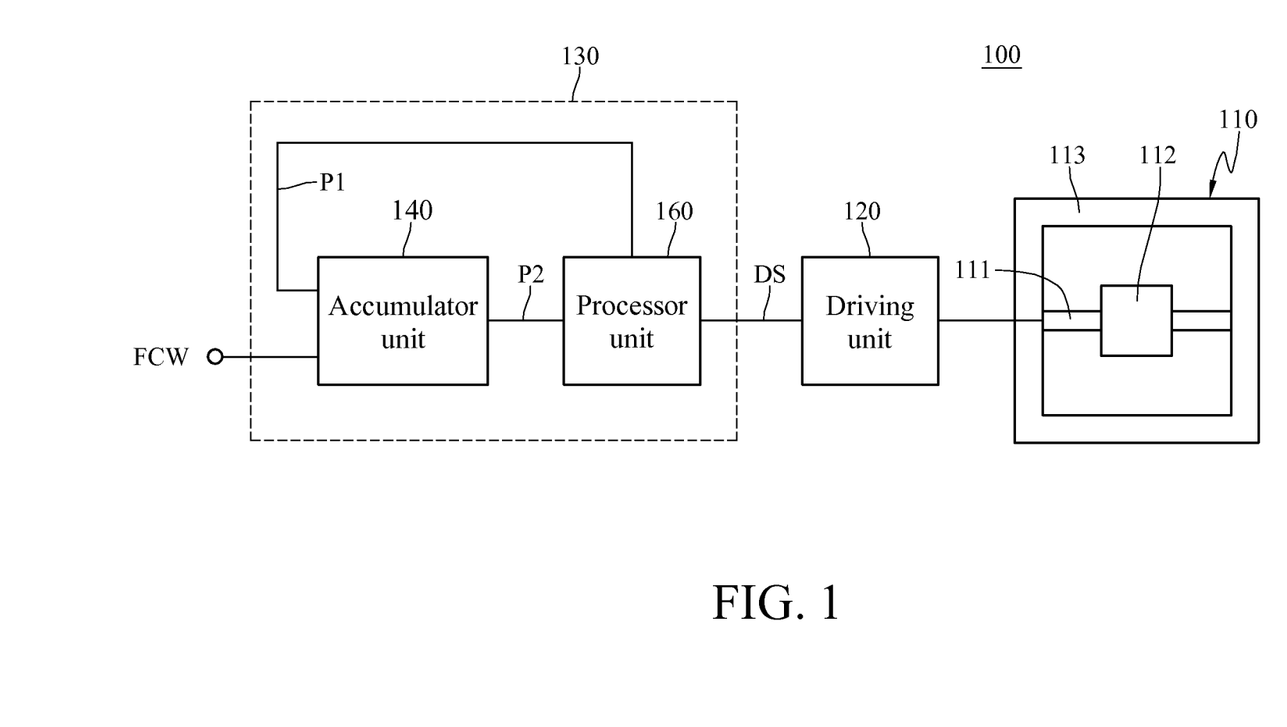
FIG. 1 is a schematic view of a scanning mirror according to one embodiment in the disclosure.

FIG. 1 is a schematic view of a scanning mirror 100 according to one embodiment in the disclosure. The scanning mirror 100 may include a mirror module 110, a driving unit 120, and a driving apparatus 130.

The mirror module 110 may include a shaft 111, a mirror structure 112, and a frame structure 113. The shaft 111 may rotate along a specific direction such as a horizontal direction or a vertical direction. The disposition of the mirror module 110 can be referred to the figuration in FIG. 1, and thus is not repeated hereinafter. The driving unit 120 may couple with the mirror module 110 and drive the shaft 111 to rotate along the specific direction to drive the mirror module 110 according to a driving signal DS.

The driving apparatus 130 may include an accumulator unit 140 and a processor unit 160. The accumulator unit 140 may receive a frequency control word FCW and a first accumulation value P1, and add up the frequency control word FCW and the first accumulation value P1 to generate a second accumulation value P2. In other words, P2=FCW+P1. The first accumulation value P1 may be the second accumulation value P2 generated in the previous accumulation.

The processor unit 160 may couple with the accumulator unit 140 and the driving unit 120 and receive the second accumulation value P2. The processor unit 160 may further adjust the second accumulation value P2 according to the second accumulation value P2 and the preset value PS to output the first accumulation value P1. Specifically, the processor unit 160 may determine whether the second accumulation value P2 is larger than the preset value PS, to decide whether to adjust the second accumulation value P2.

In one embodiment, when the second accumulation value P2 is larger than the preset value PS, the processor unit 160 may output a difference P between the second accumulation value P2 and the preset value PS, such as P=P2−PS, to be the first accumulation value P1; and otherwise, when the second accumulation value P2 is not larger than the preset value PS, the processor unit 160 may maintain or not change the second accumulation value P2, and output the un-changed second accumulation value P2 to be the first accumulation value P1. For example, the preset value PS may be $2^N$, and N may be bits available for the accumulator unit 140.

Moreover, the processor unit 160 may generate a driving signal DS according to the second accumulation value P2 and the preset value PS. In detail, the processor unit 160 may determine whether the second accumulation value P2 is larger than the preset value PS, to decide whether to adjust the driving signal DS. In one embodiment, when the second accumulation value P2 is larger than the preset value PS, the processor unit 160 may generate the driving signal DS at a high logic level; and otherwise, when the second accumulation value P2 is not larger than the preset value PS, the processor unit 160 may generate the driving signal DS at a low logic level. Also, the processor unit 160 may output the second accumulation value P2 as the first accumulation value P1 to the accumulator unit 140, for the next accumulation of the frequency control word FCW and the first accumulation value P1.

Figure 2:
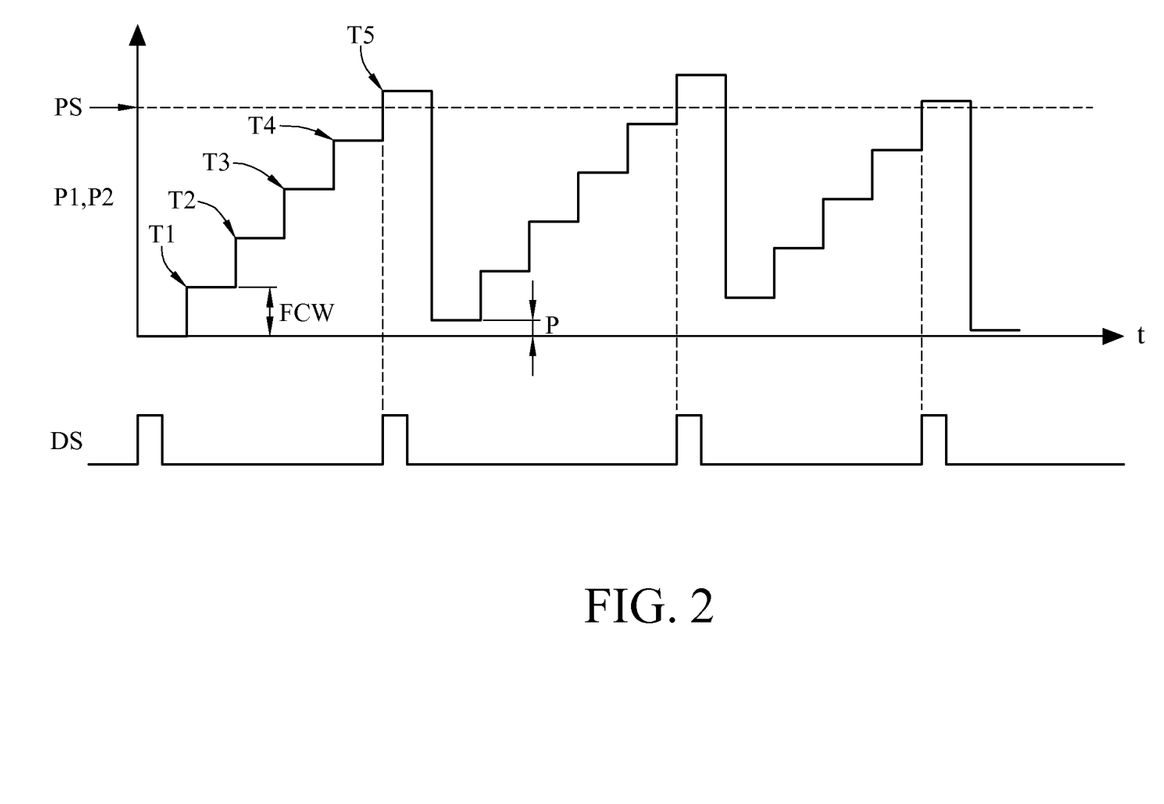
FIG. 2 is a schematic view of the relationship among a first accumulation value, a second accumulation value, a preset value, and a driving signal in the scanning mirror in FIG. 1.

Referring to FIG. 2, the relationship among the first accumulation value P1, the second accumulation value P2, the preset value PS, and the driving signal DS is shown, where labels T1, T2, T3 and T4 represent time points.

The first accumulation value P1 is 0 when the driving apparatus 130 starts up. Herein, at the time point T1, the accumulator unit 140 may add up the frequency control word FCW and the first accumulation value P1 that is 0, to generate the second accumulation value P2 that is equal to the frequency control word FCW, and then may output the second accumulation value P2 to the processor unit 160, and the processor unit 160 may compare the second accumulation value P2 with the preset value PS.

Since this second accumulation value P2 is equal to the frequency control word FCW but not larger than the preset value PS, the processor unit 160 may maintain or not change the second accumulation value P2, output the second accumulation value P2 as a new first accumulation value P1. Therefore, this new first accumulation value P1 may be equal to the frequency control word FCW, that is, the output of the processor unit 160 may still maintain at the frequency control word FCW. This first accumulation value P1 may be outputted from the processor unit 160 to the accumulator unit 140. Since the second accumulation value P2 is equal to the frequency control word FCW but not larger than the preset value PS, the processor unit 160 may output the driving signal DS at a low logic level to the driving unit 120.

Sequentially, at the time point T2, the accumulator unit 140 may add up the frequency control word FCW and the first accumulation value P1 that is equal to the frequency control word FCW, to generate a new second accumulation value P2 that is two times the frequency control word FCW, and then output this new second accumulation value P2 to the processor unit 160.

The processor unit 160 may compare this new second accumulation value P2 with the preset value PS. Since this new second accumulation value P2 is 2 times the frequency control word FCW but not larger than the preset value PS, the processor unit 160 may maintain the second accumulation value P2 that is 2 times the frequency control word FCW, and output the second accumulation value P2 as a new first accumulation value P1 to the accumulator unit 140. Therefore, this new first accumulation value P1 may be 2 times the frequency control word FCW. On the other hand, because of getting that the second accumulation value P2 two times the frequency control word FCW is not larger than the preset value PS, the processor unit 160 may output a new driving signal DS at a low logic level to the driving unit 120.

Then, at the time point T3, the accumulator unit 140 may add up the frequency control word FCW and the current first accumulation value P1 two times the frequency control word FCW, to generate a new second accumulation value P2 that is three times the frequency control word FCW, and then output this new second accumulation value P2 to the processor unit 160.

The processor unit 160 may compare the second accumulation value P2, which is three times the frequency control word FCW, with the preset value PS. Because the processor unit 160 may get that the second accumulation value P2 three times the frequency control word FCW is not larger than the preset value PS, the processor unit 160 may maintain the second accumulation value P2 at the triple of the frequency control word FCW, and output the second accumulation value P2 as a new first accumulation value P1. Therefore, this new first accumulation value P1 outputted to the accumulator unit 140 by the processor unit 160 may be three times the frequency control word FCW. On the other hand, because of getting that the second accumulation value P2 three times the frequency control word FCW is not larger than the preset value PS, the processor unit 160 may output a new driving signal DS at the low logic level to the driving unit 120.

Next, at the time point T4, the accumulator unit 140 may add up the frequency control word FCW and the first accumulation value P1 three times the frequency control word FCW to generate a new second accumulation value P2 four times the frequency control word FCW, and output the new second accumulation value P2 to the processor unit 160.

The processor unit 160 may compare the new second accumulation value P2 four times the frequency control word FCW with the preset value PS. Since the processor unit 160 may get that the second accumulation value P2 four times the frequency control word FCW is not larger than the preset value PS, the processor unit 160 may not change the second accumulation value P2 and may output the second accumulation value P2 four times the frequency control word FCW as a new first accumulation value P1 to the accumulator unit 140. Herein, this new first accumulation value P1 may be four times the frequency control word FCW. On the other hand, the processor unit 160 may get that second accumulation value P2 four times the frequency control word FCW is not larger than the preset value PS, so may output the driving signal DS at the low logic level to the driving unit 120.

At the time point T5, the accumulator unit 140 may add up the frequency control word FCW with the first accumulation value P1 four times the frequency control word FCW, to generate a new second accumulation value P2 five times the frequency control word FCW, and output this current second accumulation value P2 to the processor unit 160. Then, the processor unit 160 may compare this current second accumulation value P2 five times the frequency control word FCW with the preset value PS. Herein, since the current second accumulation value P2 is larger than the preset value PS, the processor unit 160 may subtract the preset value PS from the second accumulation value P2 five times the frequency control word FCW to generate a difference P, and output the difference P as a new first accumulation value P1. At the next counting cycle, this difference P may be set as the starting value.

Subsequently, at a time point next to the time point T5, the accumulator unit 140 may add up the frequency control word FCW and the current first accumulation value P1 that is equal to the difference P, to generate a new second accumulation value P2 equal to the frequency control word FCW plus the difference P in the next accumulation task. On the other hand, since the second accumulation value P2 five times the frequency control word FCW is larger than the preset value PS, the processor unit 160 may output the driving signal DS at the high logic level to the driving unit 120. The reset operation can be deduced by analogy.

In this way, the fine-tuned frequency resolution related with the scanning mirror 100 may be increased.

The aforementioned exemplary embodiment where the processor unit 160 may compare the second accumulation value P2 with the preset value PS to generate the driving signal DS correspondingly, but the disclosure will not be limited thereto. In an alternate exemplary embodiment below, the processor unit 160 may compare the first accumulation value P1 with the second accumulation value P2 to generate the driving signal DS. The second accumulation value P2 may be a value generated at the current accumulation, and the first accumulation value P1 may be a value generated at the previous accumulation. When the second accumulation value P2 is larger than the first accumulation value P1, the processor unit 160 may output the driving signal DS at the low logic level. When the second accumulation value P2 is not larger than the first accumulation value P1, the processor unit 160 may out the driving signal DS at the high logic level.

Take an example to illustrate the detailed operation of the alternate exemplary embodiment. Assume the frequency control word FCW is 500, the accumulator unit 140 has 10 bits (i.e. N=10), and the preset value PS is 1024 (i.e. $2^N=2^{10}=1024$). First, at the first time point, the first accumulation value P1 and the second accumulation value P2 may be 0. Then, at the second time point, the accumulator unit 140 may add up the first accumulation value P1 and the frequency control word FCW to generate the second accumulation value P2 that is 500. The second accumulation value P2 may be sent to the processor unit 160. Since the second accumulation value P2 is larger than the first accumulation value P1, the processor unit 160 may output the driving signal DS at the low logic level. The processor unit 160 may output the second accumulation value P2 (that is 500) as a new first accumulation value P1 (that is 500) to the accumulator unit 140.

At the third time point, the accumulator unit 140 may add up this new first accumulation value P1 (that is 500) and the frequency control word FCW (that is 500) to generate a new second accumulation value P2 that is 1000, and sent this new second accumulation value P2 to the processor unit 160. Herein, since this new second accumulation value P2 (that is 1000) is larger than the first accumulation value P1 (that is 500), the processor unit 160 may output a new driving signal DS at the low logic level. Moreover, the processor unit 160 may set the new second accumulation value P2 (that is 1000) as a new first accumulation value P1, and send this new first accumulation value P1 (that is 1000) to the accumulator unit 140.

At the fourth time point, the accumulator unit 140 may add up the new first accumulation value P1 (that is 1000) and the frequency control word FCW (that is 500) to generate an accumulation value that is 1500. Since this accumulation value has exceeded the preset value PS that is 1024 that may be the largest bit available for the accumulator unit 140, the overflow may occur in the accumulator unit 140. Herein, the accumulator unit 140 may subtract the preset value PS from the accumulation value to generate an accumulation value that is 476, and then output the accumulation value that is 476 as a new second accumulation value P2 to the processor unit 160. Since this new second accumulation value P2 (that is 476) is larger than the first accumulation value P1 (that is 1000), the processor unit 160 may output a new driving signal DS at the high logic level.

Then, the processor unit 160 may set the second accumulation value P2 that is 476 to be a new first accumulation value P1 that is 476, and output the new first accumulation value P1 that is 476 to the accumulator unit 140, and this new first accumulation value P1 that is 476 may be set as a starting value of the next counting cycle. The reset of operation in the alternate exemplary embodiment can be deduced by analogy.

Accordingly, the alternate exemplary embodiment may also increase the fine-tuned frequency resolution related with the scanning mirror 100 as the same as the previous exemplary embodiment.

Figure 3:
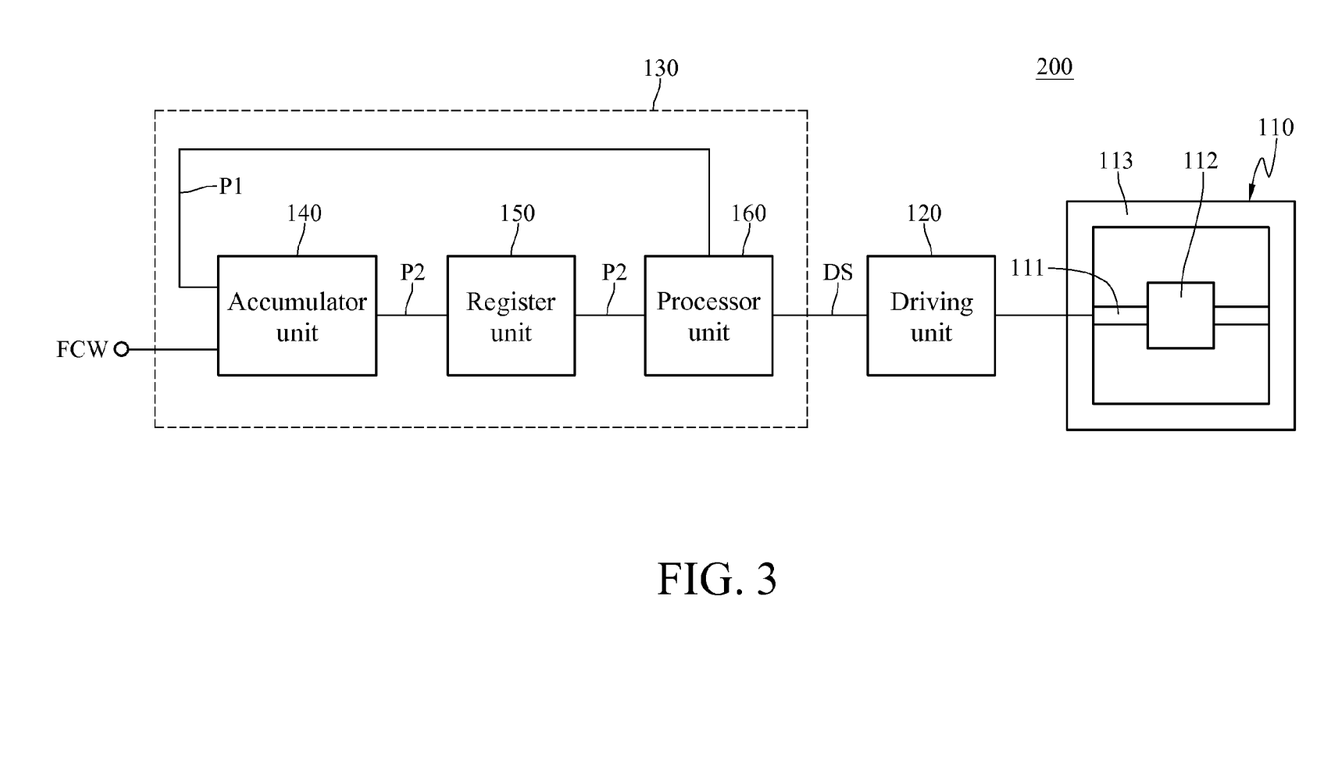
FIG. 3 is a schematic view of a scanning mirror according to one embodiment in the disclosure.

FIG. 3 is a schematic view of a scanning mirror 200 according to one embodiment in the disclosure. The scanning mirror 200 may include the mirror module 110, the driving unit 120, and the driving apparatus 130 in the scanning mirror 100 in FIG. 1. The driving apparatus 130 may include a register unit 150 and further include the accumulator unit 140 and the processor unit 160 in the scanning mirror 100 in FIG. 1. The register unit 150 may couple with the accumulator unit 140 and the processor unit 160 and receive, store and output the second accumulation value P2.

For example, the register unit 150 may be a D flip-flop whose input end D may receive the previous second accumulation value P2 and whose output end Q may output the current second accumulation value P2. Moreover, the register unit 150 may latch the second accumulation value P2 whereby the current second accumulation value P2 may be the same as the previous second accumulation value P2, to avoid the occurring of operation errors. The operation of the scanning mirror 200 can be referred to the relative description of FIG. 1 and FIG. 2, and thus is not repeated hereinafter.

Figure 4:
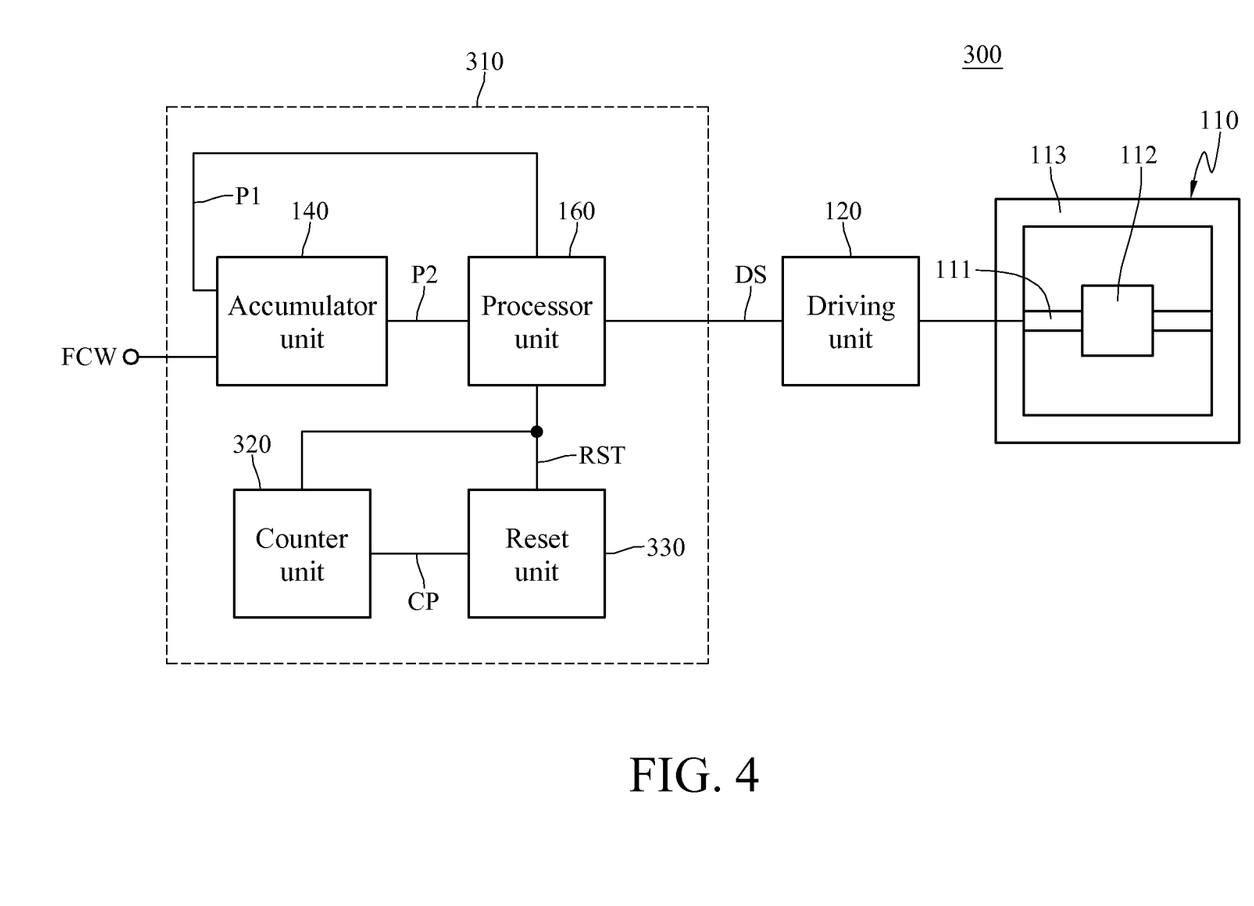
FIG. 4 is a schematic view of a scanning mirror according to one embodiment in the disclosure.

FIG. 4 is a schematic view of a scanning mirror 300 according to one embodiment in the disclosure. The scanning mirror 300 may include a mirror module 110, a driving unit 120, and a driving apparatus 310. The connection relationship and operation between the mirror module 110 and the driving unit 120 can be referred to the description related to FIG. 1, and thus is not repeated hereinafter.

The driving apparatus 310 may include an accumulator unit 140, a processor unit 160, a counter unit 320, and a reset unit 330. The operation of the accumulator unit 140 and the processor unit 160 can be referred to the description related to FIG. 1, and thus is not repeated hereinafter.

The counter unit 320 may generate a count value CP which may be an integer chronologically becoming 0, 1, 2, 3, 4, 5, or so on, and the interval between the previous and current count values CP may be the same, but the disclosure will not be limited thereto. In an alternate embodiment, the interval between the previous and current count values CP may be changed according to actual requirements.

The reset unit 330 may couple with the counter unit 320 and the processor unit 160, receive the count value CP, and output a reset signal RST to the counter unit 320 and the processor unit 160 according to the count value CP and the default count value. For example, this default count value may be a frame refreshing period of one frame. In other words, whenever the count value CP approaches the frame refreshing period of one frame, the reset unit 330 may generate the reset signal RST, so that the counter unit 320 may reset the count value CP. Therefore, the counter unit 320 may set the count value CP to be 0 for the next accumulation.

Whenever the processor unit 160 receives the reset signal RST, the processor unit 160 may be reset to generate a new driving signal DS, e.g. the driving signal DS at the high logic level. Simultaneously, the processor unit 160 may reset the second accumulation value P2 to be 0 or a constant value, and output the reset second accumulation value P2 as the reset first accumulation value P1 to the accumulator unit 140. Therefore, the accumulator unit 140 may set the reset first accumulation value P1 to be a starting value of the next counting cycle for performing the accumulation again. The aforementioned constant value may be defined according to actual requirements.

In this way, the phase of the shaft 111 may return to the initial state to make the scan tracking of the scanning mirror 300 return to the starting point, thereby reducing the screen flicker and increasing the fine-tuned frequency resolution.

Figure 5:
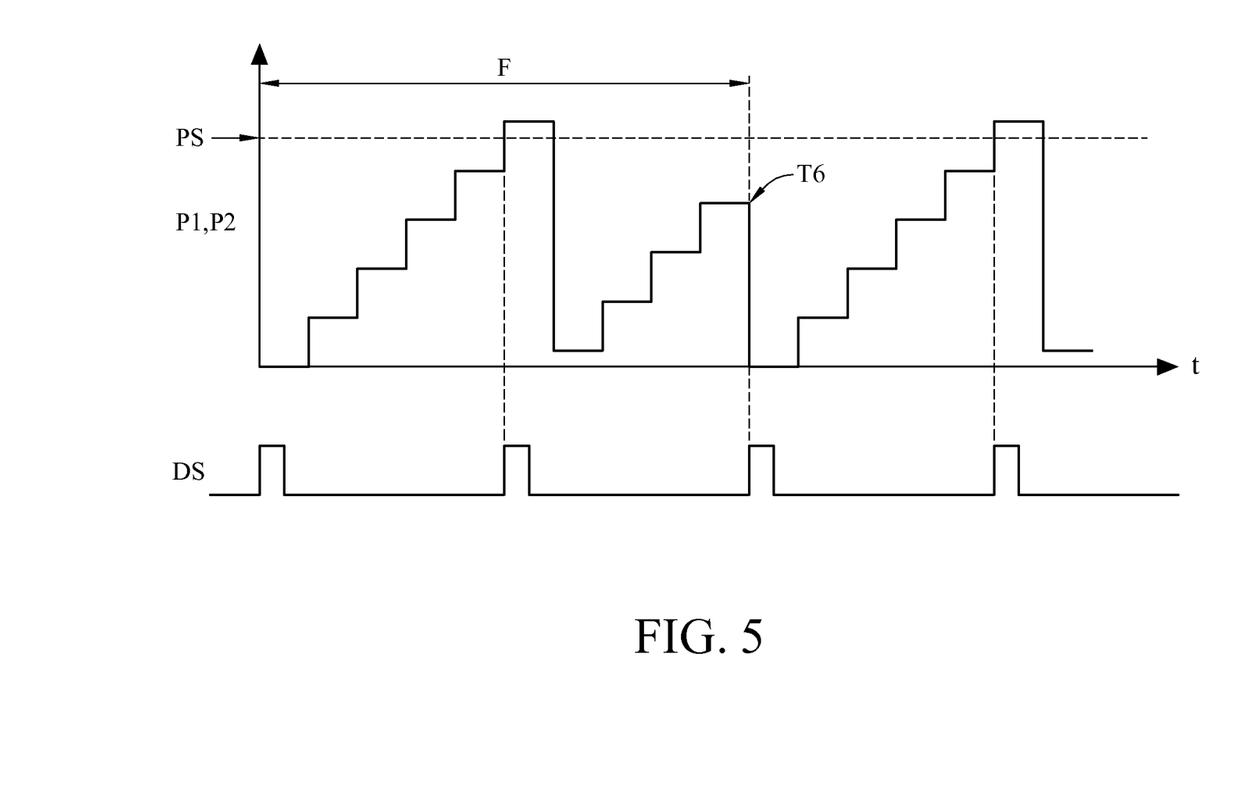
FIG. 5 is a schematic view of the relationship among a first accumulation value, a second accumulation value, a preset value, a driving signal, and a frame refreshing period of a frame in the scanning mirror in FIG. 4.

Referring to FIG. 5, the relationship among the first accumulation value P1, the second accumulation value P2, the preset value PS, the driving signal DS and the frame refreshing period F of one frame in FIG. 4 is shown, where label T6 represents a time point. At the time point T6, the count value CP generated by the counter unit 320 may approach the frame refreshing period F of one frame, and the reset unit 330 may then output the reset signal RST to the counter unit 320 to reset the count value CP, for the accumulation in the next counting cycle.

Moreover, the reset signal RST may be sent to the processor unit 160, so that the processor unit 160 may reset the second accumulation value P2 and set the reset second accumulation value P2 as the reset first accumulation value P1. This reset first accumulation value P1 may be outputted to the accumulator unit 140 to be the starting value for the next counting cycle. For example, the second accumulation value P2 may be reset to be 0 or a constant value.

Also, when the processor unit 160 receives the reset signal RST, the processor unit 160 may be reset to generate a new driving signal DS (e.g. the driving signal DS at the high logic level) that may make the phase of the shaft 111 return to the initial state. This may ensure that the scan track of the scanning mirror 300 goes back to the starting point, thereby avoid the screen flickers.

Figure 6:
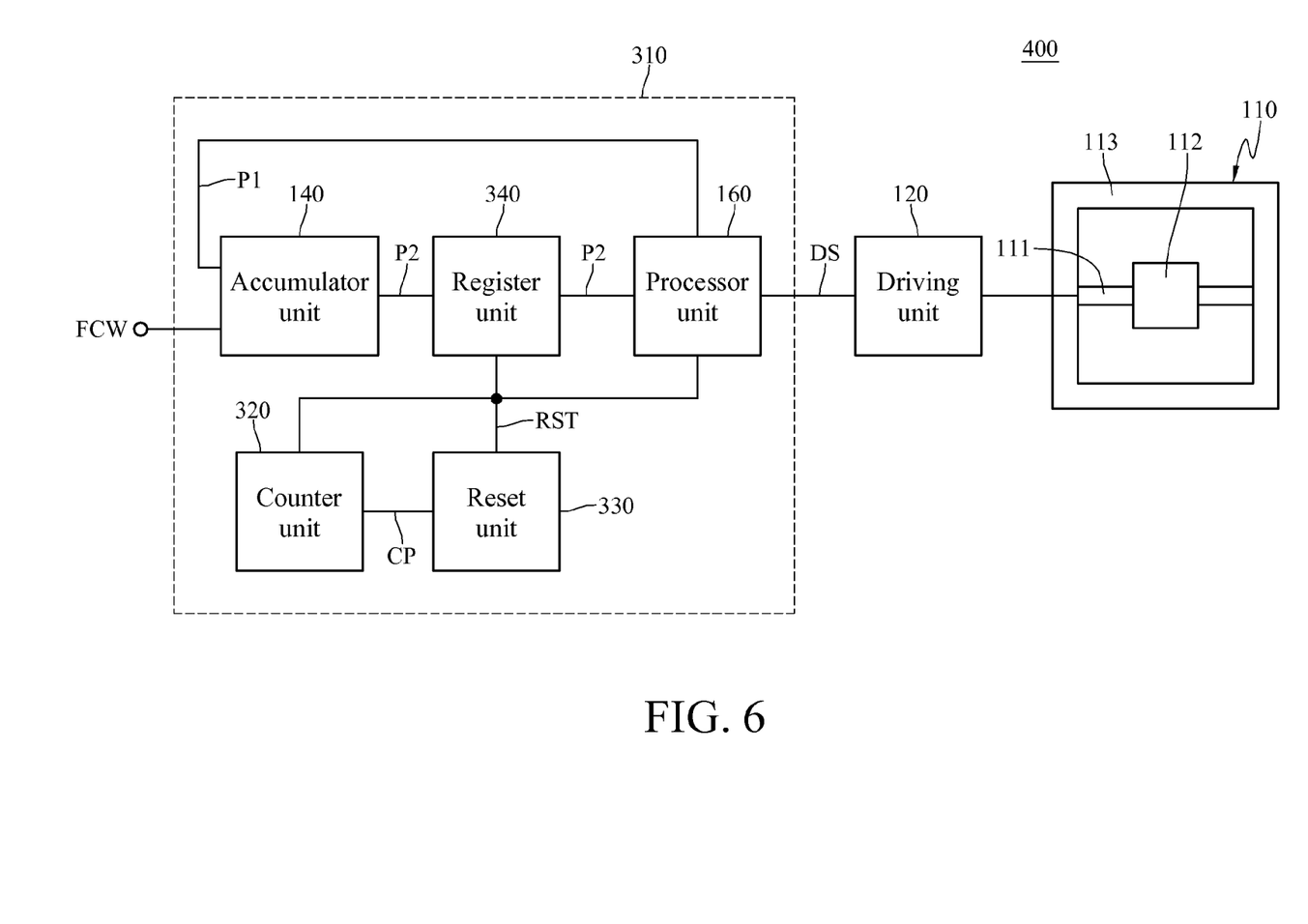
FIG. 6 is a schematic view of a scanning mirror according to one embodiment in the disclosure.

FIG. 6 is a schematic view of a scanning mirror 400 according to one embodiment in the disclosure. The scanning mirror 400 may include the mirror module 110, the driving unit 120, and the driving apparatus 310 in the scanning mirror 300 in FIG. 4. The driving apparatus 310 may include a register unit 340 and further include the accumulator unit 140, the processor unit 160, the counter unit 320, and the reset unit 330 in FIG. 4.

The register unit 340 may couple with the accumulator unit 140 and the processor unit 160, and receive, store, and output the second accumulation value P2. The operation of the register unit 340 can be referred to the description related to the register unit 150 in FIG. 3, and thus is not repeated hereinafter. Furthermore, the register unit 340 may couple with the reset 330. Whenever the reset unit 330 generates the reset signal, the register unit 340 may reset the second accumulation value P2, and output the reset second accumulation value P2, e.g. the reset second accumulation value P2 may be 0.

The operation of the scanning mirror 400 can be referred to the description related to the scanning mirrors in FIG. 4 and FIG. 5, and thus is not repeated hereinafter.

In the above one or more embodiments, a single-axis component may taken as an example of the mirror module 110, but the disclosure will not be limited thereto. In one or more other embodiments, a dual-axis component may be taken as an example of the mirror module.

Figure 7:
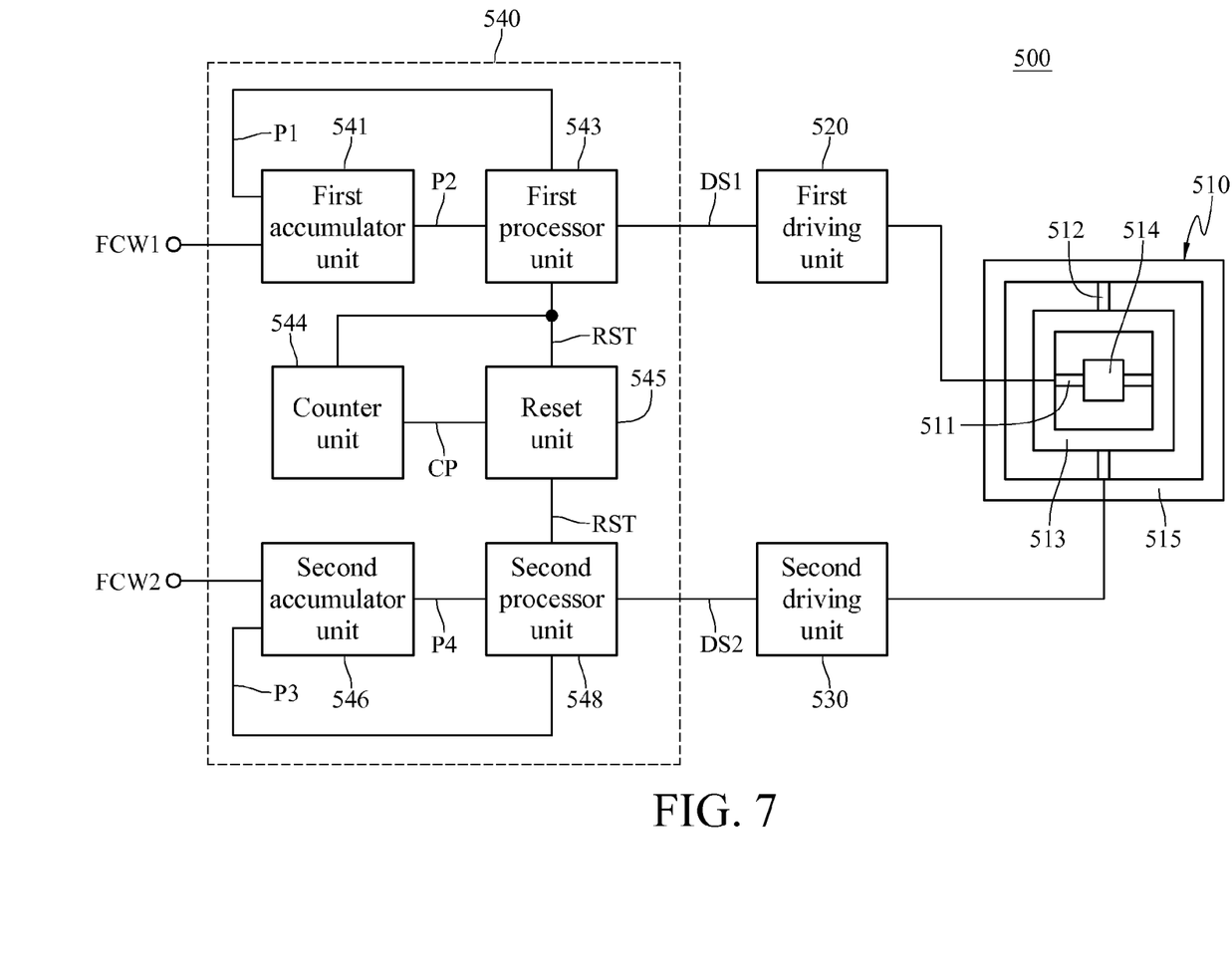
FIG. 7 is a schematic view of a scanning mirror according to one embodiment in the disclosure.

FIG. 7 is a schematic view of a scanning mirror according to one embodiment in the disclosure. The scanning mirror 500 may include a mirror module 510, a first driving unit 520, a second driving unit 530, and a driving apparatus 540.

The mirror module 510 may be a dual-axis component with a first shaft 511, a second shaft 512, a mass block 513, a mirror structure 514, and a frame structure 515. The first shaft 511 may rotate along a first direction, and the second shaft 512 may rotate along a second direction different from the first direction. For example, while the first direction is a vertical direction, the second direction is a horizontal direction; otherwise, while the first direction is a horizontal direction, the second direction is a vertical direction. The disposition of the mirror module 510 can be referred the figuration shown in FIG. 5, and thus not repeated hereinafter.

The first driving unit 520 may couple with the first shaft 511, and drive the first shaft 511 to rotate along the first direction to drive the mirror module 510 according to the first driving signal DS1. The second driving unit 530 may couple with the second shaft 512, and drive the second shaft 512 to rotate along the second direction to drive the mirror module 510 according to second driving signal DS2. In one embodiment, the first shaft 511 may control the fast axis of the mirror module 510, and the second shaft 512 may control the slow axis of the mirror module 510.

The driving apparatus 540 may include a first accumulator unit 541, a first processor unit 543, a counter unit 544, a reset unit 545, a second accumulator unit 546, and a second processor unit 548.

The first accumulator unit 541 may receive the first frequency control word FCW1 and the first accumulation value P1, add up the first frequency control word FCW1 and the first accumulation value P1 to generate a second accumulation value P2 (i.e. P2=FCW1+P1). The operation of the first accumulator unit 541 can be referred to the description related to the accumulator unit 140 in FIG. 1, and thus not repeated hereinafter.

The first processor unit 543 may couple with the first accumulator unit 541 and the first driving unit 520, receive the second accumulation value P2, generate a first driving signal DS1 according to the second accumulation value P2 and the first preset value PS1, and adjust the second accumulation value P2 according to the second accumulation value P2 and the first preset value PS1 to output the first accumulation value P1. The operation of the first processor unit 543 can referred to the description related to the processor unit 160 in FIG. 1, and thus is not repeated hereinafter.

The second accumulator unit 546 may receive the second frequency control word FCW2 and a third accumulation value P3, and add up the second frequency control word FCW2 and the third accumulation value P3 to generate a fourth accumulation value P4 (i.e. P4=FCW2+P3). In the embodiment, the first frequency control word FCW1 may differ from the second frequency control word FCW2. The operation of the second accumulator unit 546 can be referred to the description related to the accumulator unit 140 in FIG. 1, and thus is not repeated hereinafter.

The second processor unit 548 may couple with the second accumulator unit 546 and the second driving unit 530, receive the fourth accumulation value P4, generate a second driving signal DS2 according to the fourth accumulation value P4 and the second preset value PS2, and adjust the fourth accumulation value P4 to output a third accumulation value P3 according to the fourth accumulation value P4 and the second preset value PS2. The operation of the second processor unit 548 can be referred to the description related to the processor unit 160 in FIG. 1, and thus is not repeated hereinafter.

The counter unit 544 may generate a count value CP. The operation of the counter unit 544 can referred to the description related to the counter unit 320 in FIG. 3, and thus is not repeated hereinafter.

The reset unit 545 may couple with the counter unit 544, the first processor unit 543, and the second processor unit 548. The reset unit 545 may receive the count value CP, and generate a reset signal RST for the counter unit 544, the first processor unit 543, and the second processor unit 548 according to the count value CP and the default count value. Then, the counter unit 544 may reset the count value CP, so that the counter unit 544 may reset the count value CP to be 0 for the next count task.

When the first processor unit 543 and the second processor unit 548 receive the reset signal RST, the first processor unit 543 and the second processor unit 548 will be reset and generate a new first driving signal DS1 (e.g. the first driving signal DS1 at the high logic level) and a new second driving signal DS2 (e.g. the second driving signal DS2 at the high logic level) respectively. Also, the first processor unit 543 and the second processor unit 548 may reset the second accumulation value P2 and the fourth accumulation value P4 to be 0 or constant values, and set the reset second accumulation value P2 and the reset fourth accumulation value P4 to be the reset first accumulation value P1 and the reset third accumulation value P3 respectively.

Then, the first processor unit 543 and the second processor unit 548 may respectively output the reset first accumulation value P1 and the reset third accumulation value P3 that are 0 or constant values to the first accumulator unit 541 and the second accumulator unit 546. Therefore, the first accumulator unit 541 and the second accumulator unit 546 may determine the reset first accumulation value P1 and the reset third accumulation value P3 as starting values of a next counting cycle for performing the accumulation again. The aforementioned constant value may be defined according to actual requirements.

Therefore, the phase of the first shaft 511 and of the second shaft 512 may simultaneously return to the initial state. This may result in that the scan track of the scanning mirror 500 is capable of returning to the starting point, and that the first shaft 511 and the second shaft 512 do not have a phase difference therebetween, and then may result in the decreasing of screen flickers.

Figure 8:
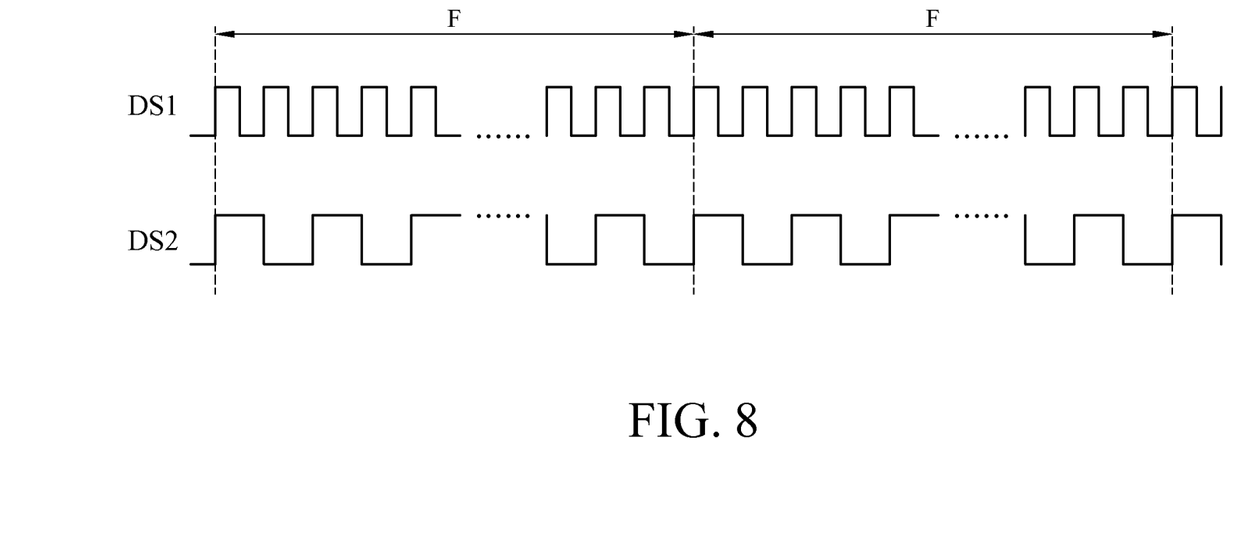
FIG. 8 is a schematic view of the relationship among a first driving signal, a second driving signal, and a frame refreshing period of a frame in the scanning mirror in FIG. 7.

Referring to FIG. 8, the relationship among the first driving signal DS1, the second driving signal DS2, and the frame refreshing period F in FIG. 7 is shown. At the end point of a first frame refreshing period and the start point of a second frame refreshing period, both of the first driving signal DS1 and the second driving signal DS2 may be at the high logic level, so that the phase of the first shaft 511 and of the second shaft 512 may simultaneously return to the initial state, thereby reducing the screen flickers.

Figure 9:
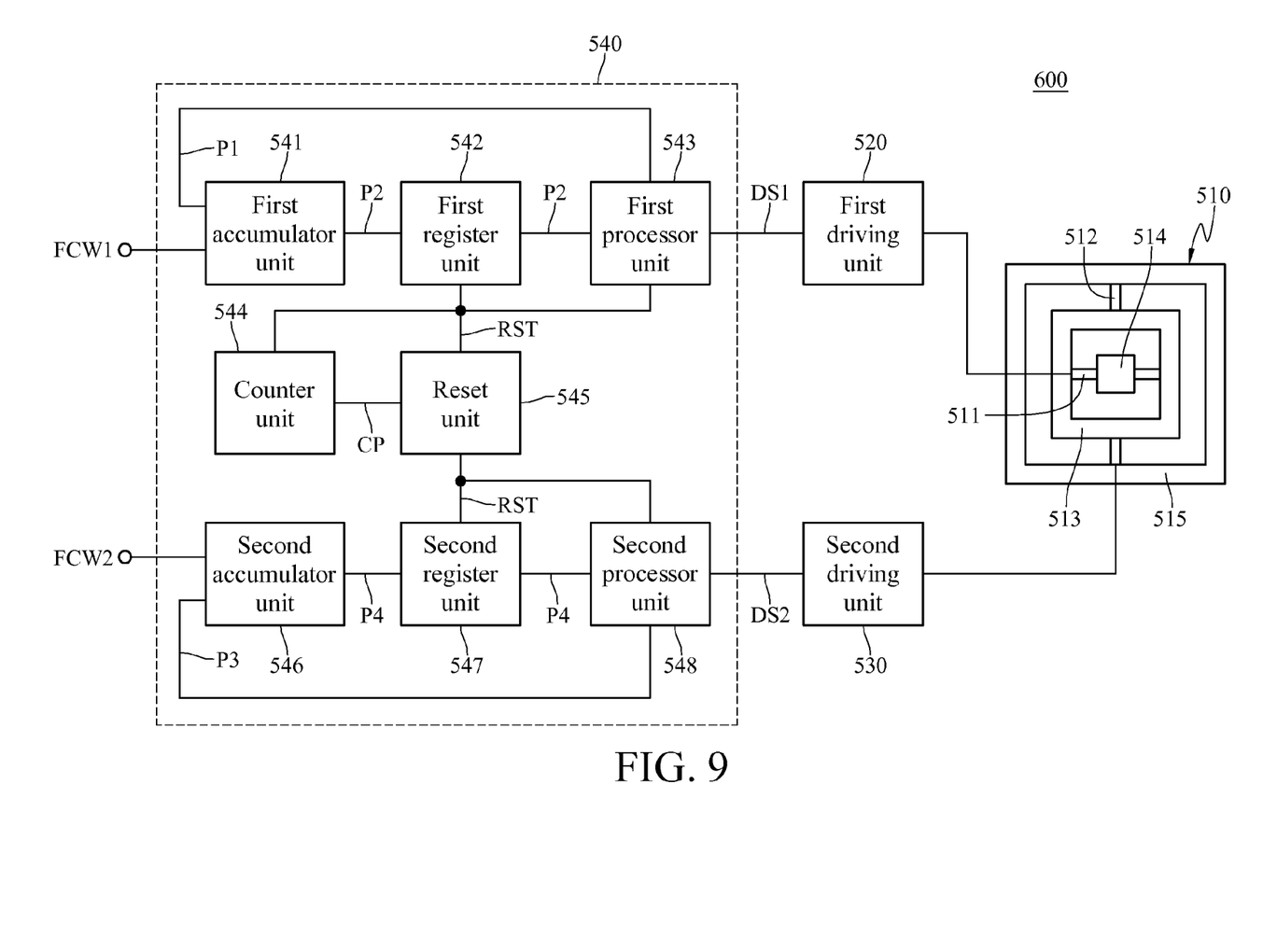
FIG. 9 is a schematic view of a scanning mirror according to one embodiment in the disclosure.

FIG. 9 is a schematic view of a sixth embodiment of a scanning mirror in the disclosure. A scanning mirror 600 may include the mirror module 510, the first driving unit 520, the second driving unit 530, and the driving apparatus 540 in the scanning mirror 500 in FIG. 7. The driving apparatus 540 may include a first register unit 542 and a second register unit 547, and further include the first accumulator unit 541, the first processor unit 543, the counter unit 544, the reset unit 545, the second accumulator unit 546, and the second processor unit 548 in FIG. 7.

The first register unit 542 may couple with the first accumulator unit 541 and the first processor unit 543, and receive, store, and output the second accumulation value P2. The second register unit 547 may couple with the second accumulator unit 546 and the second processor unit 548, and receive and store the fourth accumulation value P4 to generate a fourth accumulation value P4. The operation of the first register unit 542 and of the second register unit 547 may be referred to the description related to the register unit 340 in FIG. 6, and thus is not repeated hereinafter.

The first register unit 542 may couple with the reset unit 545. When the reset unit 545 generates a reset signal, the first register unit 542 may reset the second accumulation value P2 no matter what the second accumulation value P2 is, to output the reset second accumulation value P2, e.g. the second accumulation value P2 at the low logic level 0. The second register unit 547 may couple with the reset unit 545. When the reset unit 545 generates a reset signal, the second register unit 547 may reset the fourth accumulation value P4 to output the reset fourth accumulation value P4, e.g. the fourth accumulation value P4 at the low logic level 0. The reset of the description related to the scanning mirror 600 can be referred to the description related to FIG. 7 and FIG. 8, and thus is not repeated hereinafter.

In view of the aforementioned one or more embodiments of the scanning mirror, the disclosure also provides a driving method for the scanning mirror according to one or more embodiments described below.

Figure 10:
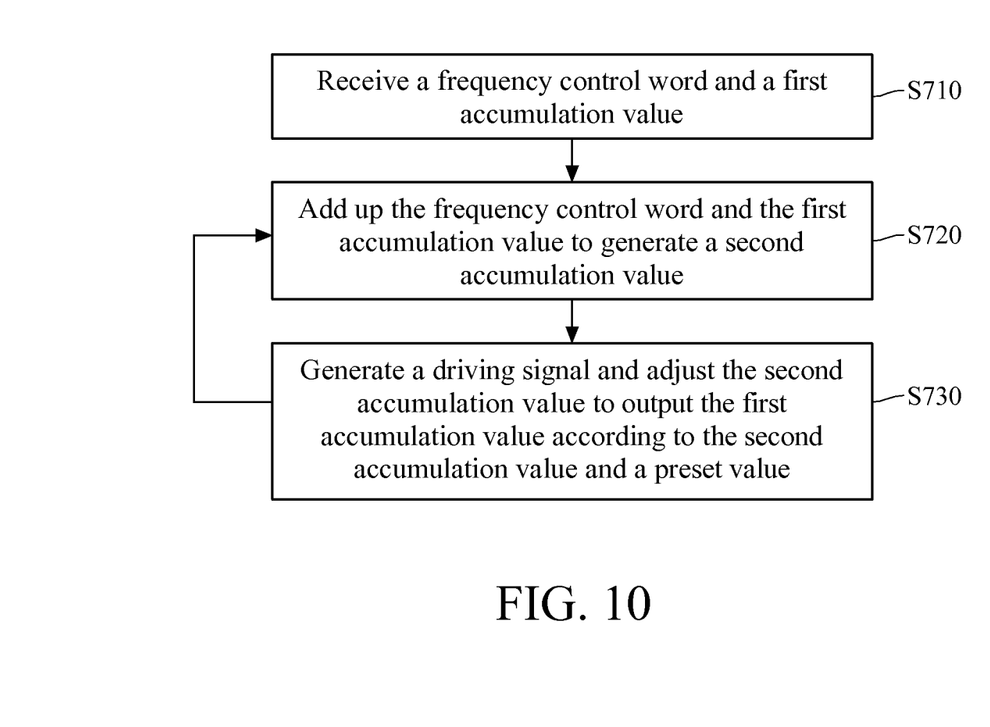
FIG. 10 is a flow chart of a driving method for a scanning mirror according to one embodiment in the disclosure.

FIG. 10 is a flow chart of a driving method for a scanning mirror according to one embodiment in the disclosure. As shown in step S710, a frequency control word and a first accumulation value may be received. As shown in step S720, the frequency control word and the first accumulation value may added up to generate a second accumulation value.

As shown in step S730, according to the second accumulation value and the preset value, a driving signal may be generated and the second accumulation value may be adjusted and then outputted as a new first accumulation value. After this new first accumulation value is outputted in step S730, the frequency control word and this new first accumulation value may be added up to generate a new second accumulation value for generating a new driving signal, as shown in step S720.

Figure 11:
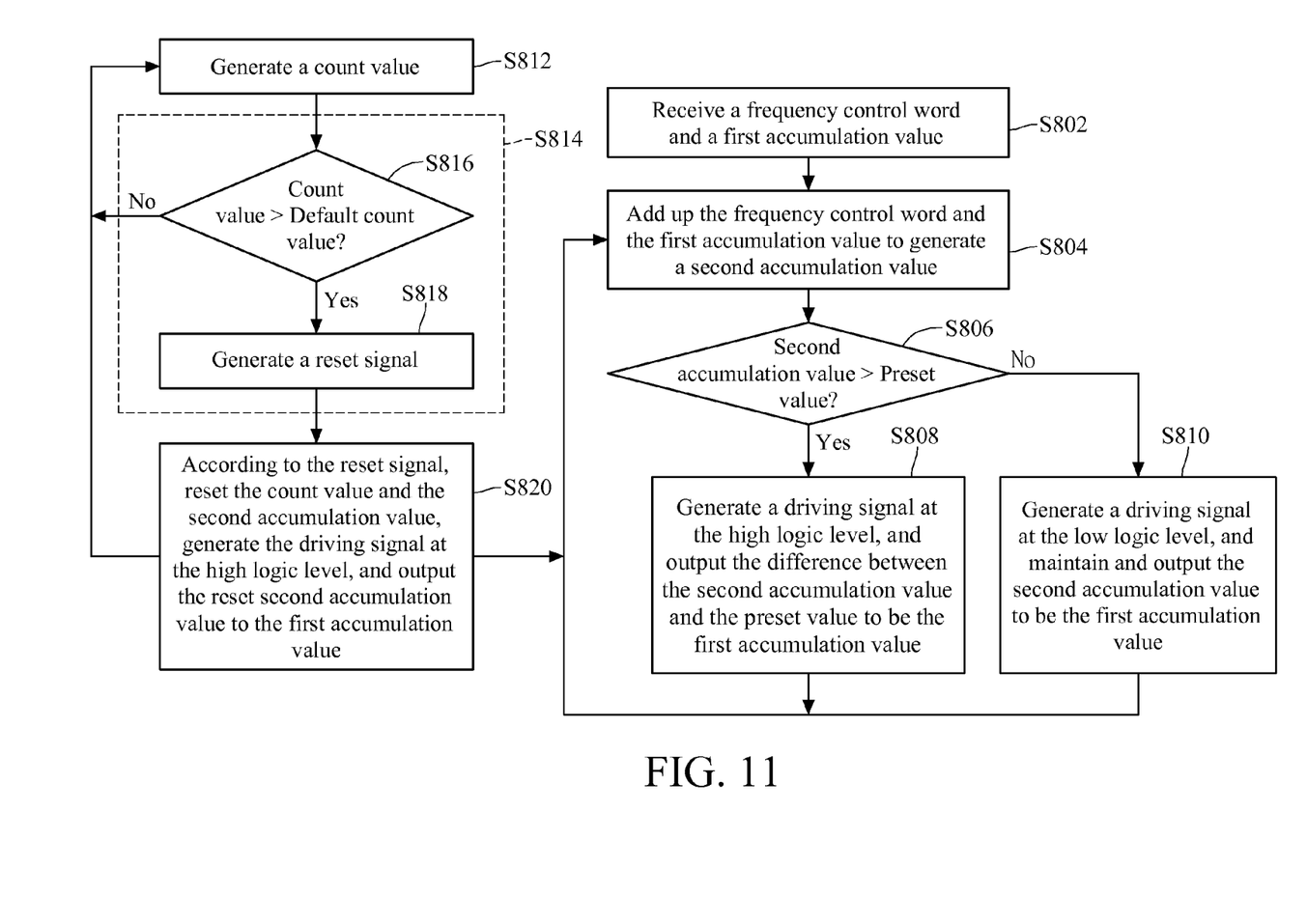
FIG. 11 is a flow chart of a driving method for a scanning mirror according to one embodiment in the disclosure.

FIG. 11 is a flow chart of a driving method for a scanning mirror according to one embodiment in the disclosure. As shown in step S802, a frequency control word and a first accumulation value may be received. As shown in step S804, the frequency control word and the first accumulation value may be added up to generate a second accumulation value.

As shown in step S806, whether the second accumulation value is larger than the preset value may be determined. When the second accumulation value is larger than the preset value, as shown in step S808, a driving signal at the high logic level may be generated, and the difference between the second accumulation value and the preset value may be outputted as a new first accumulation value for the following accumulation. After the first accumulation value is outputted in step S808, the frequency control word and this new first accumulation value may be added up to generate a new second accumulation value (i.e. the difference between the frequency control word and this new first accumulation value), as shown in step S804.

Alternately, when the first accumulation value is not larger than the preset value, as shown in step S810, the driving signal at the low logic level may be generated and the second accumulation value may be maintained and then outputted as a new first accumulation value. After this new first accumulation value is outputted in step S810, the frequency control word and this first accumulation value (i.e. a third accumulation value) may be added up to generate a new second accumulation value, as shown in step S804.

On the other hand, as shown in step S812, a count value may be generated. As shown step S814, a reset signal may be generated according to the count value and a default count value which may be a frame refreshing period of one frame. In detail, as shown in step S816, whether the count value is larger than the default count value may determined. When the count value is not larger than the default count value, a new count value may be generated again as shown in step S812. Otherwise, when the count value is larger than the default count value, a reset signal may be generated as shown in step S818.

Then, as shown in step S820, according to the reset signal, the count value and the second accumulation value may be reset, the driving signal at the high logic level may be generated, and the reset second accumulation value may be outputted as a new first accumulation value. After step S820, the process may return to step S804 where the frequency control word and this new first accumulation value may be added up, and to step S812 where the count value may be reset, and then repeat the aforementioned steps.

As set forth above, in the disclosure may add up the frequency control word and the first accumulation value to generate the second accumulation value via the accumulator unit, generate the driving signal at the high logic level or low logic level according to the second accumulation value and the preset value, and after adjusting the second accumulation value, output the adjusted second accumulation value as a new first accumulation value for the following accumulation. Moreover, the disclosure may employ the reset unit to compare the count value generated by the counter unit with the default count value to generate the reset signal. According to the reset signal, the count value and the second accumulation value may be reset, the driving signal at the high logic level may be generated, and the reset second accumulation value may be outputted as a new first accumulation value for the following accumulation. In this way, the fine-tuned frequency resolution may increase, the phase of the driving signal may be fixed, and the scan track may return to the starting point, resulting in the decreasing of the screen flickers.

What is claimed is:

1. A driving apparatus for a scanning mirror, comprising:
   an accumulator unit, configured to receive and add up a frequency control word and a first accumulation value to generate a second accumulation value; and
   a processor unit, coupled with the accumulator unit and configured to, according to the second accumulation value and a preset value, generate a driving signal and adjust the second accumulation value to output the first accumulation value;
   wherein the processor unit determines whether the second accumulation value is larger than the preset value; when the second accumulation value is larger than the preset value, the processor unit outputs the driving signal at a high logic level, and outputs a difference between the second accumulation value and the preset value to be the first accumulation value; and when the second accumulation value is not larger than the preset value, the processor unit outputs the driving signal at a low logic level, maintains the second accumulation value, and outputs the second accumulation value as the first accumulation value.

2. The driving apparatus according to claim 1, further comprising:
   a register unit, coupled with the accumulator unit and the processor unit and configured to receive and store the second accumulation value, and output the second accumulation value.

3. The driving apparatus according to claim 1, further comprising:
   a counter unit, configured to output a count value; and
   a reset unit, coupled with the counter unit and the processor unit and configured to receive the count value, output a reset signal to the counter unit and the processor unit according to the count value and a default count value, whereby the counter unit resets the count value, and the processor unit is reset to generate the driving signal correspondingly, reset the second accumulation value, and output the reset second accumulation value to be the first accumulation value.

4. The driving apparatus according to claim 3, further comprising:

a register unit, coupled with the accumulator unit, the processor unit, and the reset unit and configured to receive, store, and output the second accumulation value, and to reset the second accumulation value when receiving the reset signal.

5. The driving apparatus according to claim 3, wherein the default count value is a frame refreshing period of a frame.

6. A scanning mirror, comprising:
a mirror module, comprising a first shaft for rotating along a first direction;
a first driving unit, coupled with the first shaft and configured to drive the first shaft to rotate along the first direction to drive the mirror module according to a first driving signal;
a first accumulator unit, configured to receive a first frequency control word and a first accumulation value and add up the first frequency control word and the first accumulation value to generate a second accumulation value; and
a first processor unit, coupled with the first accumulator unit and the first driving unit and configured to receive the second accumulation value, and according to the second accumulation value and a first preset value, generate the first driving signal and adjust the second accumulation value to output the first accumulation value;
wherein the first processor unit determines whether the second accumulation value is larger than the first preset value; when the second accumulation value is larger than the first preset value, the first processor unit generates the first driving signal at a high logic level, and outputs a first difference between the second accumulation value and the first preset value to be the first accumulation value; and when the second accumulation value is not larger than the first preset value, the first processor unit generates the first driving signal at a low logic level, maintains the second accumulation value, and outputs the second accumulation value to be the first accumulation value.

7. The scanning mirror according to claim 6, further comprising:
a first register unit, coupled with the first accumulator unit and the first processor unit and configured to receive, store, and output the second accumulation value.

8. The scanning mirror according to claim 6, further comprising:
a counter unit, configured to generate a count value; and
a reset unit, coupled with the counter unit and the first processor unit and configured to receive the count value, and according to the count value and a default count value, output a reset signal to the counter unit and the first processor unit, whereby the counter unit resets the count value, the first processor unit is reset to generate the first driving signal correspondingly, reset the second accumulation value, and output the reset second accumulation value to be a reset first accumulation value.

9. The scanning mirror according to claim 8, further comprising:

a first register unit, coupled with the first accumulator unit, the first processor unit, and the reset unit, and configured to receive, store, and output the second accumulation value, and to reset the second accumulation value when receiving the reset signal.

10. The scanning mirror according to claim 8, wherein the mirror module further comprises a second shaft which rotates along a second direction different from the first direction, and the scanning mirror further comprises:
a second driving unit, coupled with the second shaft, and configured to according to a second driving signal, rotate the second shaft along the second direction to drive the mirror module;
a second accumulator unit, configured to receive a second frequency control word and a third accumulation value, and add up the second frequency control word and the third accumulation value to generate a fourth accumulation value; and
a second processor unit, coupled with the second accumulator unit and the second driving unit, and configured to receive the fourth accumulation value, generate the second driving signal according to the fourth accumulation value and a second preset value, and adjust the fourth accumulation value to output the third accumulation value,
wherein when the second processor unit receives the reset signal, the second processor unit is reset, generates the second driving signal correspondingly, resets the fourth accumulation value, and outputs the reset fourth accumulation value as the reset the third accumulation value.

11. The scanning mirror according to claim 10, wherein the second processor unit determines whether the fourth accumulation value is larger than the second preset value; when the fourth accumulation value is larger than the second preset value, the second processor unit generates the second driving signal at a high logic level, and outputs a second difference between the fourth accumulation value and the second preset value to be the third accumulation value; and when the fourth accumulation value is not larger than the second preset value, the second processor unit generates the second driving signal at a low logic level, maintains the fourth accumulation value, and outputs the fourth accumulation value to be the third accumulation value.

12. The scanning mirror according to claim 10, further comprising:
a first register unit, coupled with the first accumulator unit, the first processor unit, and the reset unit, and configured to receive, store, and output the second accumulation value, and to reset the second accumulation value when receiving the reset signal; and
a second register unit, coupled with the second accumulator unit, the second processor unit, and the reset unit, and configured to receive, store, and output the fourth accumulation value, and to reset the fourth accumulation value when receiving the reset signal.

13. The scanning mirror according to claim 10, wherein the default count value is a frame refreshing period of a frame.

* * * * *